United States Patent [19]

Bunch et al.

[11] Patent Number: 4,531,711
[45] Date of Patent: Jul. 30, 1985

[54] VALVE AND STEM SEAL THEREFOR

[75] Inventors: Paul D. Bunch; Russell E. Stevens, both of Houston, Tex.

[73] Assignee: Cameron Iron Works, Inc., Houston, Tex.

[21] Appl. No.: 393,539

[22] Filed: Jun. 30, 1982

[51] Int. Cl.³ .............................................. F16K 41/04
[52] U.S. Cl. .................................... 251/214; 277/205; 277/207 A
[58] Field of Search .................. 251/214, 266, 267; 277/123, 124, 125, 188 R, 190, 191, 197, 198, 205, 207 A, 216

[56] References Cited

U.S. PATENT DOCUMENTS

| | | | |
|---|---|---|---|
| 851,746 | 4/1907 | Hageman | 277/32 |
| 2,417,828 | 3/1947 | Joy | 277/188 R |
| 2,891,827 | 6/1959 | Butkus | 277/205 |
| 3,048,412 | 8/1962 | Baker | 277/75 |
| 3,192,942 | 7/1965 | Manor et al. | 277/124 |
| 3,271,038 | 9/1966 | Bastow | 277/205 |
| 3,554,569 | 1/1971 | Gorman | 277/205 |
| 3,788,600 | 1/1974 | Allen | 251/214 |
| 3,907,307 | 9/1975 | Maurer et al. | 277/124 |
| 4,169,604 | 10/1979 | Heathcott | 277/205 |
| 4,327,923 | 5/1982 | Chesterton et al. | 277/124 |
| 4,410,189 | 10/1983 | Myers et al. | 277/205 |

FOREIGN PATENT DOCUMENTS

| | | | |
|---|---|---|---|
| 2600153 | 7/1976 | Fed. Rep. of Germany | 277/207 A |
| 985295 | 7/1951 | France | 277/205 |

Primary Examiner—George L. Walton
Attorney, Agent, or Firm—Vinson & Elkins

[57] ABSTRACT

A valve having a valve member with a stem connected to an actuator and an improved stem seal for sealing between the stem and the interior of the body on a bonnet attached thereto. The improved stem sealing assembly includes a U-shaped resilient seal ring with means in its open end to ensure sealing engagement of the multiple internal and external sealing lips with the stem and body sealing surfaces and support rings positioned in grooves between the sealing lips and anti-extrusion means engaging the closed end of the seal ring to prevent extrusion of the seal ring. A modified sealing assembly also includes a back-up seal and anti-extrusion means therefor.

20 Claims, 3 Drawing Figures

VALVE AND STEM SEAL THEREFOR

BACKGROUND

The present invention relates to an improved valve having an improved stem seal which will maintain its seal against high pressures, elevated temperatures and with rotary and axial cycling of the valve stem.

Prior stem seals have utilized inverted U-shaped ring seals having a plurality of sealing lips on the interior and exterior sealing surfaces and with a spring within the opening of the ring to urge the lips outward and inward into sealing engagement. An example of such a seal structure is shown in U.S. Pat. No. 4,103,909. Such seal structure has not been satisfactory because the sealing lips wear responsive to movement, they are not held in their desired sealing position when they are exposed to pressure, and there is no protection against extrusion of the lips.

SUMMARY

The present invention relates to an improved valve having an improved stem seal. The valve includes a body having a chamber therein, an inlet into said chamber, and outlet from said chamber, a valve seat in said chamber surrounding said outlet, and an opening from said chamber, a valve member on a stem positioned in said chamber with said stem extending through said opening, a bonnet secured to said body around said opening, surrounding said stem and having a sealing surface spaced radially outward from said stem, a sealing assembly positioned in the space between said bonnet sealing surface and said stem. The sealing assembly includes a resilient annular U-shaped sealing ring having a plurality of sealing lips with grooves therebetween on its outer annular surface and on its inner annular surface, support rings positioned in and substantially filling said grooves and back-up means for supporting said sealing ring, and to prevent extrusion of the sealing ring to provide a back-up or secondary seal.

An object of the present invention is to provide an improved valve with an improved stem seal which can be used to seal against high pressure even when exposed to elevated temperatures.

Another object is to provide an improved valve stem seal utilizing material which is inert to corrosive fluids and elevated temperatures without having the material extrude or fail from excessive wear.

A further object is to provide an improved valve stem seal having a plurality of sealing lips which are retained in their desired sealing engagement position when exposed to pressure.

Still another object of the present invention is to provide an improved valve stem seal which withstands multiple rotary and axial movement cycles while subject to high pressure and elevated temperature.

BRIEF DESCRIPTION OF THE DRAWINGS

These and other objects and advantages are hereinafter set forth and explained with respect to the drawings wherein.

DESCRIPTION OF THE PREFERRED EMBODIMENTS

Figure 1:
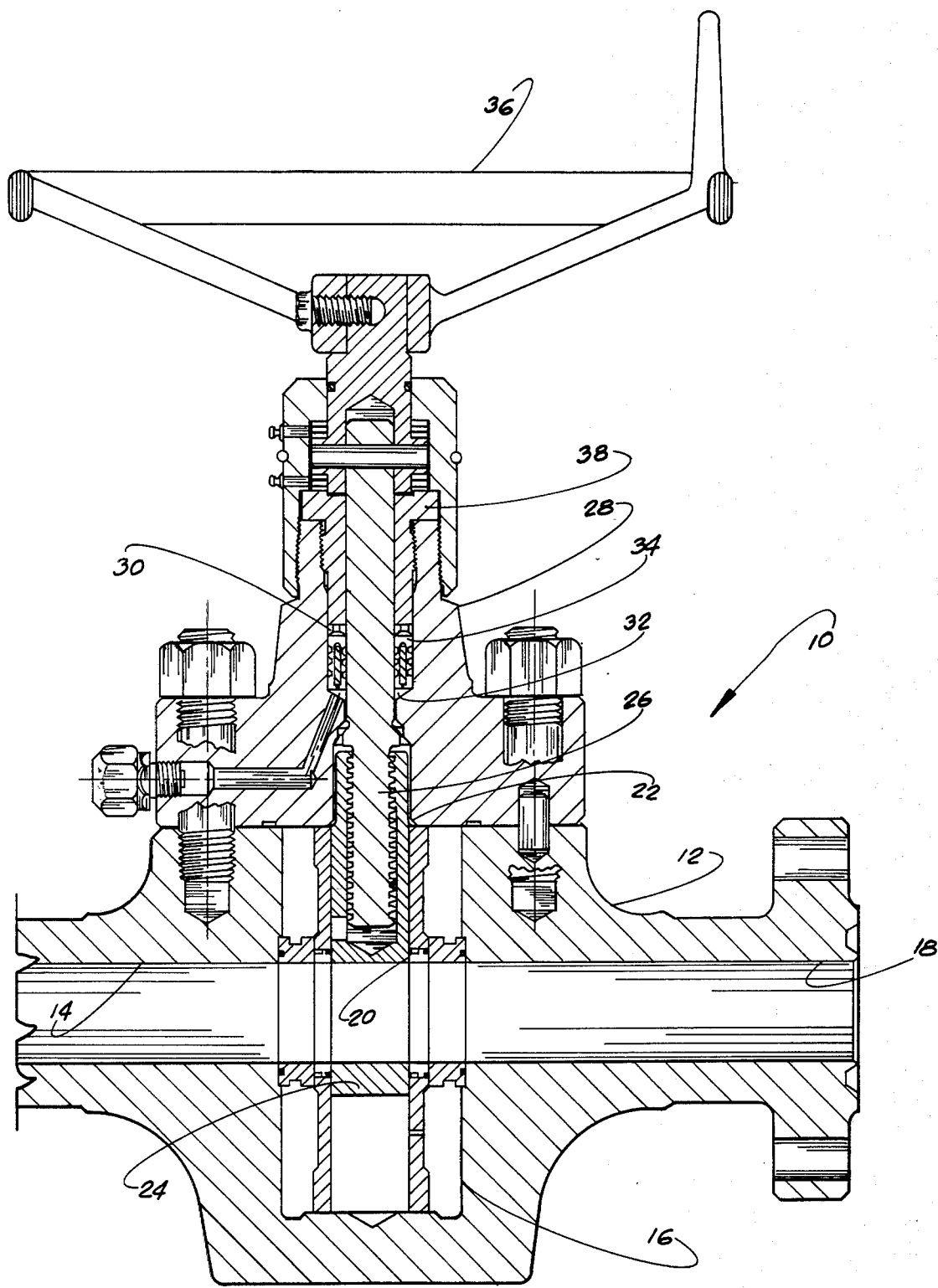
FIG. 1 is a sectional view of the improved valve of the present invention.

Valve 10, shown in FIG. 1, is a gate valve and includes body 12 having inlet 14 into chamber 16, outlet 18 from chamber 16 with valve seat 20 surrounding outlet 18 in chamber 16 and opening 22 from chamber 16. Valve member 24 is positioned in chamber 16 and movable to allow or prevent flow through outlet 18 by its engagement of valve seat 20. Stem 26 is threaded into valve member 24 so that as it is rotated valve member 24 is moved in chamber 16 with respect to valve seat 20. Stem 26 extends through opening 22 and into bonnet 28 which is secured to body 12 around opening 22. The interior of bonnet 28 includes sealing surface 30 surrounding and spaced radially outward from stem 26 to provide the annular space 32 in which the improved sealing assembly 34 of the present invention is positioned to seal between stem 26 and surface 30. Hand wheel 36 is secured to stem 26 to provide actuation means for moving valve member 24. Packing nut 38 threads into bonnet 28 around stem 26 to retain seal assembly 34 in its preselected position in space 32.

Figure 2:
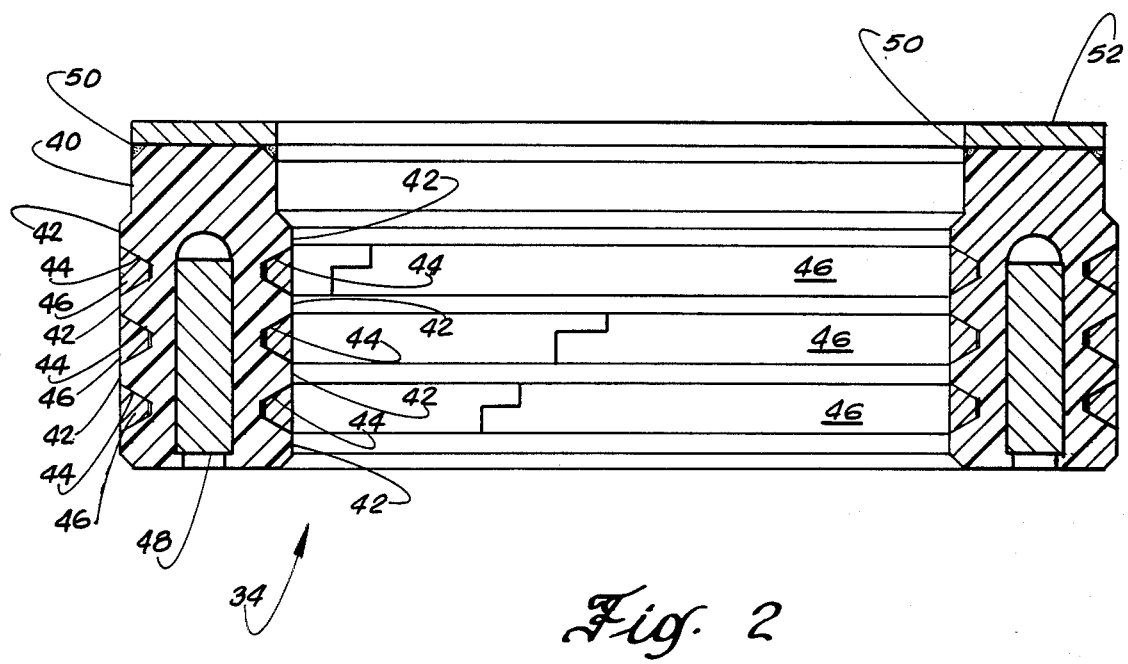
FIG. 2 is a sectional view of one form of improved stem seal assembly of the present invention.

Sealing assembly 34 shown in detail in FIG. 2 includes U-shaped resilient annular body or seal ring 40 having its closed end facing away from the pressure in valve body 12 and its two legs with the annular opening therebetween facing the high pressure in body 12. Ring 40 includes a plurality of sealing lips 42 with grooves 44 therebetween on its inner and outer annular surfaces. Support rings 46, which are split rings as shown, are positioned within grooves 44 and substantially fill their respective grooves. When rings 46 are positioned in grooves 44, lips 42 extend a slight distance (approximately 0.010 inches) beyond the wear surface of rings 46 to assure that they will be in sealing engagement with the surface against which they are to seal. Preload ring 48 is positioned within the open end of U-shaped ring 40. Ring 48 is slightly thicker than the free radial dimension of the interior of the opening in ring 40. Thus, ring 48 moves the sides of ring 40 outward so that lips 42 are in sealing engagement with sealing surface 30 on bonnet 28 and the exterior surface of stem 26.

Wedge rings 50 engage the inner and outer portions of the closed end of ring 40 to prevent its extrusion and back-up ring 52 is positioned between the closed end of ring 40 and the inner end of packing nut 38 and supports wedge rings 50 as shown. Wedge rings 50 are positioned as shown so that any increase in axial loading of ring 40 also results in an increase loading of rings 50 against their respective cylindrical surfaces to ensure that ring 40 is not extruded.

Sealing assembly 34, when positioned as shown in FIG. 1, has provided sealing between stem 26 and sealing surface 30 against a pressure of 20,000 psi, with thermal cycling up to 300° F. and under both rotary and linear cycling movement of stem 26. In the unit tested, seal ring 40 was a polytetrafluoroethylene such as sold by W. S. Shamban & Co. under the trademark "Turcite 99". Preload ring 48 and back-up ring 52 were a titanium alloy identified as TI-6AL-4V. Support rings 46 and wedge rings 50 were a beryllium copper alloy identified as C17200.

Figure 3:
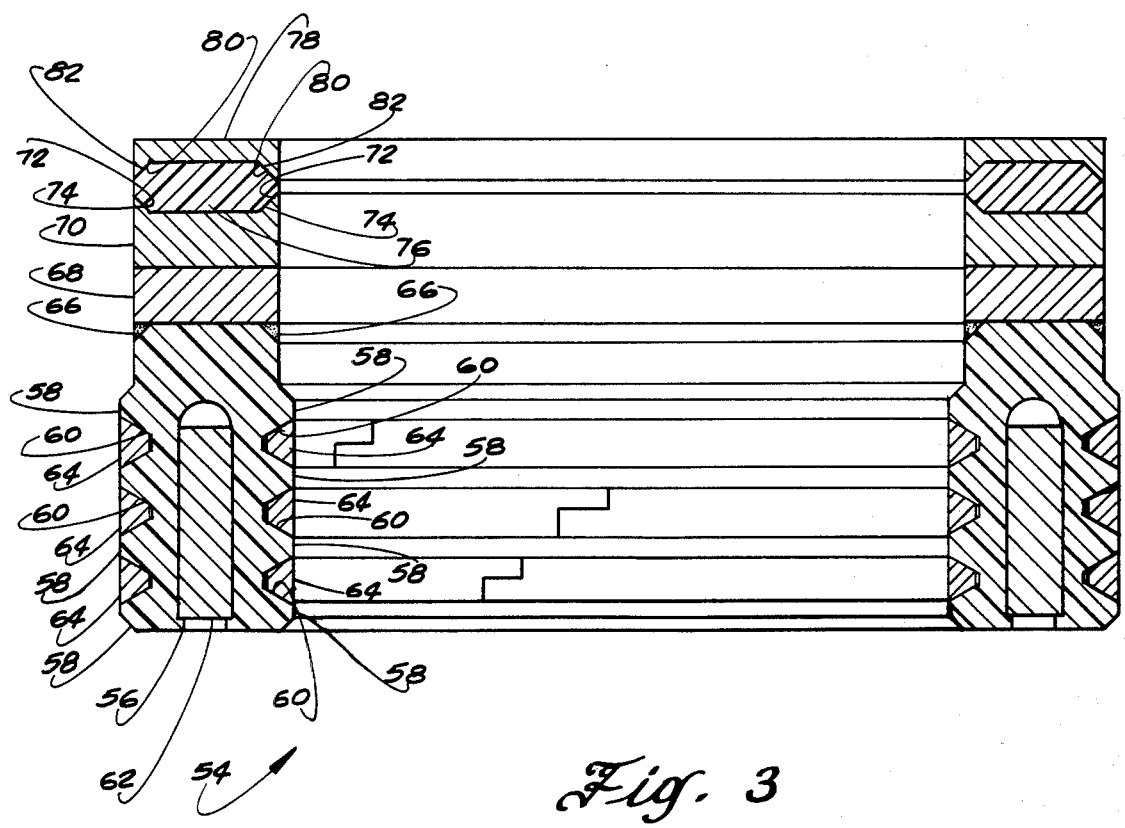
FIG. 3 is a sectional view of another form of improved stem seal assembly of the present invention.

Modified sealing assembly 54, shown in FIG. 3, includes U-shaped seal ring 56 having a plurality of internal and external sealing lips 58 with grooves 60 therebetween, preload ring 62 positioned in the open end of seal ring 56, wedge rings 66 abutting the inner and outer portions of the closed end of seal ring 56, and support rings 64 positioned in grooves 60, all as described with respect to sealing assembly 34. Sealing assembly 54 also includes bearing support ring 68 engaging the closed end of seal ring 56 and wedge ring 66 as shown, back-up seal ring 70 having inner and outer tapered surfaces 72 engaging the mating surfaces 74 on back-up seal 76 and anti-extrusion ring 78 having inner and outer tapered surfaces 80 engaging the mating surfaces 82 of ring 78. Thus, sealing assembly 54 is substantially the same as sealing assembly 34 except that it includes the elements providing a secondary seal and the anti-extrusion means.

The materials of the components of sealing assembly 54 are preferably the same as set forth above for sealing assembly 34. Bearing support ring 68 and anti-extrusion ring 78 are preferably a beryllium copper alloy identified as C17200. Back-up seal ring 70 is preferably a polytetrafluoroethylene material and back-up seal 76 is preferably a material similar to U-shaped ring 56 as sold by W. S. Shamban & Co. under the trademark "TURCITE 1022".

Since sealing assembly 54 is substantially the same as sealing assembly 34, it has the same improved useful life under conditions of high pressure, cycling temperature and cycling rotary and axial stem movement.

What is claimed is:

1. A valve comprising
   a body having a chamber, an inlet and an outlet communicating into the chamber, and a valve seat surrounding said outlet and said chamber,
   a valve member positioned in the chamber,
   actuating means,
   a valve stem connecting said actuating means to said valve member to move said valve member between positions allowing flow through said outlet and preventing flow through said outlet,
   a sealing assembly between said stem and said body, and having
   a resilient annular body with a plurality of internal lips for sealing against said stem and a plurality of external lips for sealing against said body, and a plurality of grooves between said internal lips and between said external lips, and
   a support ring positioned radially in each of said grooves and and between each of said lips substantially filling the groove in which it is positioned to support the extremities of each of said lips above and below said support rings to prevent excessive extrusion of each of said lips,
   each of said lips extending slightly beyond its adjacent support rings for sealing engagement with said stem and said body.
2. A valve according to claim 1 including
   means for expanding said annular body both outward and inward toward the surfaces of said stem and said body against which it is to seal.
3. A valve according to claim 1 wherein
   said annular body has a U-shape in section.
4. A valve according to claim 3 including
   a preload ring positioned in the open end of annular body and having a thickness greater than the radial dimension of the annular body opening to further urge said lips into sealing engagement with said stem and said body.
5. A valve according to claim 1 including
   anti-extrusion means engaging the low pressure end of said annular body.
6. A valve according to claim 5 wherein said anti-extrusion means includes
   inner and outer wedge rings engaging the tapered corners of the closed end of said annular body, and
   a back-up ring engaging the closed end of said annular body and the low pressure surfaces of said wedge rings.
7. A valve according to claim 6 including
   a back-up seal ring beyond said wedge rings, and
   anti-extrusion means engaging said back-up seal ring to prevent its extrusion along the surfaces against which it is to seal.
8. A valve according to claim 1 wherein
   said support rings are made from a bearing type material.
9. A valve according to claim 8 wherein
   the material of said support rings is a beryllium copper alloy.
10. A valve according to claim 1 wherein
    said annular body is made of a polytetrafluoroethylene material.
11. A seal for sealing between a valve body and a valve stem of a valve comprising
    an annular resilient body having a plurality of sealing lips on its outer and inner surfaces with grooves between said lips,
    a support ring positioned radially in said grooves and between each of said lips substantially filling its grooves to support the extremities of each of said lips above and below said support rings to protect each of said lips from excessive deformation and wear and
    each of said lips extending slightly beyond its adjacent support rings for sealing engagement with the surfaces of said valve body and said valve stem against which it is to seal.
12. A stem seal according to claim 11 including
    means for expanding said annular body both outward and inward toward the surfaces of said stem and said body against which it is to seal.
13. A stem seal according to claim 11 wherein
    said annular body has a U-shape in section.
14. A stem seal according to claim 13 including
    a preload ring positioned in the open end of annular body and having a thickness greater than the radial dimension of the annular body opening to further urge said lips into sealing engagement with said stem and said body.
15. A stem seal according to claim 11 including
    anti-extrusion means engaging the low pressure end of said annular body.
16. A stem seal according to claim 15
    inner and outer wedge rings engaging the tapered corners of the closed end of said annular body, and
    a back-up ring engaging the closed end of said annular body and the low pressure surfaces of said wedge rings.
17. A stem seal according to claim 16 including
    a back-up seal ring beyond said wedge rings, and
    anti-extrusion means engaging said back-up seal ring to prevent its extrusion along the surfaces against which it is to seal.
18. A stem seal according to claim 11 wherein
    said support rings are made from a bearing type material.
19. A stem seal according to claim 18 wherein
    the material of said support rings is a beryllium copper alloy.
20. A valve according to claim 11 wherein
    said annular body is made of a polytetrafluoroethylene material.

* * * * *